United States Patent [19]
Hummel et al.

[11] Patent Number: 5,683,202
[45] Date of Patent: Nov. 4, 1997

[54] ADJUSTABLE SOCKET FOR SUPPORTING A ROLLER IN A PRINTING MACHINE

[75] Inventors: Peter Hummel, Offenbach; Robert Ortner, Alzenau, both of Germany

[73] Assignee: MAN Roland Druckmaschinen AG, Germany

[21] Appl. No.: 624,172

[22] Filed: Mar. 29, 1996

[30] Foreign Application Priority Data

Mar. 30, 1995 [DE] Germany ............... 195 11 710.7

[51] Int. Cl.$^6$ ............... F16C 13/02; F16C 23/00; B41F 13/20
[52] U.S. Cl. ............... 403/325; 101/216
[58] Field of Search ............... 101/348, 216; 400/600.2; 242/598.4; 403/325

[56] References Cited

U.S. PATENT DOCUMENTS

| | | |
|---|---|---|
| 3,167,010 | 1/1965 | Worthington et al. |
| 3,480,225 | 11/1969 | Alexeff ............... 242/598.4 |
| 4,030,704 | 6/1977 | Beierle et al. ............... 242/598.4 X |
| 4,385,559 | 5/1983 | Jarach ............... 101/348 X |
| 4,759,286 | 7/1988 | Witczak ............... 101/216 |
| 5,022,251 | 6/1991 | Negrussi ............... 101/216 X |
| 5,241,905 | 9/1993 | Guaraldi et al. ............... 101/216 |

FOREIGN PATENT DOCUMENTS

| | | | |
|---|---|---|---|
| 42 16 781 A1 | 11/1993 | Germany. | |
| 1942 | of 1912 | United Kingdom ............... | 101/348 |

*Primary Examiner*—Anthony Knight
*Attorney, Agent, or Firm*—Leydig, Voit & Mayer, Ltd.

[57] ABSTRACT

A socket for releasably supporting the journal of a roller in a printing machine is disclosed. In one embodiment, the socket includes: a mounting; an adjusting screw threadably received in the mounting; a locking lever rotatably coupled to the adjusting screw; and a spring element concentrically mounted on the adjusting screw between the locking lever and the free end of the screw such that turning the adjusting screw changes the degree of compression of the spring. The locking lever is coupled to the adjusting screw for movement between locked and unlocked positions. In the locked position, the locking lever is biased into engagement with the roller journal by the bias of the spring to secure the roller within the socket. In the unlocked position, the locking lever is pivoted out of engagement with the journal such that the roller can be easily removed and replaced.

24 Claims, 2 Drawing Sheets

ADJUSTABLE SOCKET FOR SUPPORTING A ROLLER IN A PRINTING MACHINE

FIELD OF THE INVENTION

The present invention relates generally to printing machines, and more particularly to an adjustable socket for supporting a roller in a printing machine such as a rotary printing press.

BACKGROUND OF THE INVENTION

It is well known that rollers are used for a variety of purposes in sheet fed rotary printing machines. In the past, such rollers have been rotatably supported within the printing machine by plug-in axles, by roller locks, and by bearings disposed on journals and secured within sockets arranged on the frame of the press. In the latter case, the sockets are generally releasable to permit changing of the rollers. They are also typically adjustable such that the pressure exerted on adjacent rollers or drums by the roller supported by the sockets can be changed by adjusting the position of the sockets. This adjustability is advantageous, for example, in an inking unit where the amount of ink transferred is dependent upon the pressure exerted by the ink roller on its adjacent plate cylinder. By adjusting the sockets carrying the ink roller, a user can vary the amount of pressure applied to the plate cylinder by the ink roller and, thus, control the amount of ink transferred by the inking unit.

Such an adjustable socket is disclosed in German Patent Specification No. DE 4,216,781 A1, which discloses an improvement of the structures disclosed in U.S. Pat. 3,167,010. The socket disclosed in that German patent specification includes a spring element which is prestressed within a bearing body and is disposed for linear movement on an adjustable screw. Although this socket is intended to be universally usable with different types of rollers, its usability is limited by the bulk of its structure. More particularly, the size and positioning of the spring element and its corresponding support structure restricts the amount of space available for removing and installing rollers. This problem is particularly acute with respect to rollers that are arranged in a compact manner, for example, in roller trains of inking units and the like where the space available for removing and installing rollers is often quite restricted.

In addition to the foregoing limitation, the socket disclosed in the above referenced German patent specification is further disadvantaged in that it does not include any means for reproducing settings from one roller change to the next. In other words, everytime a roller is changed, the socket disclosed in German Patent Specification No. DE 4,216,781 must be re-adjusted to insure the roller serviced by the socket exerts a desired amount of pressure on its adjacent roller. This limitation increases the time required for changing rollers.

OBJECTS OF THE INVENTION

It is a general object of the present invention to provide an improved socket for supporting rollers in a printing machine. It a more specific object to provide such an improved socket that is suitable for use with many different types of rollers and which does not unduly restrict the space available within the printing machine for changing rollers.

It is another object of the invention to provide an improved roller supporting socket which automatically applies the same pressure to the roller it supports after a roller change as it did to the roller it supported prior to the change. It is a related object to provide an improved roller supporting socket which automatically adjusts its position when a new roller is installed.

SUMMARY OF THE INVENTION

The present invention accomplishes these objectives and overcomes the drawbacks of the prior art by providing a socket for releasably supporting a rotationally symmetrical component in a frame. The socket includes: a mounting attached to the frame and including a seat for receiving the rotationally symmetrical component; an adjusting screw rotationally coupled to the mounting and having a first threaded end and a second end opposite the first end; a locking lever disposed between the mounting and the second end of the adjusting screw; and a spring for biasing the locking lever towards the mounting. The locking lever is linearly movable along the longitudinal axis of the adjusting screw and is also rotatable about the longitudinal axis of the adjusting screw between a locked position and an unlocked position. When in the locked position, the locking lever engages the rotationally symmetrical component to secure the rotationally symmetrical component within the socket.

These and other features and advantages of the invention will be more readily apparent upon reading the following description of the preferred embodiment of the invention and upon reference to the accompanying drawings wherein:

DESCRIPTION OF THE PREFERRED EMBODIMENTS

Figure 1:
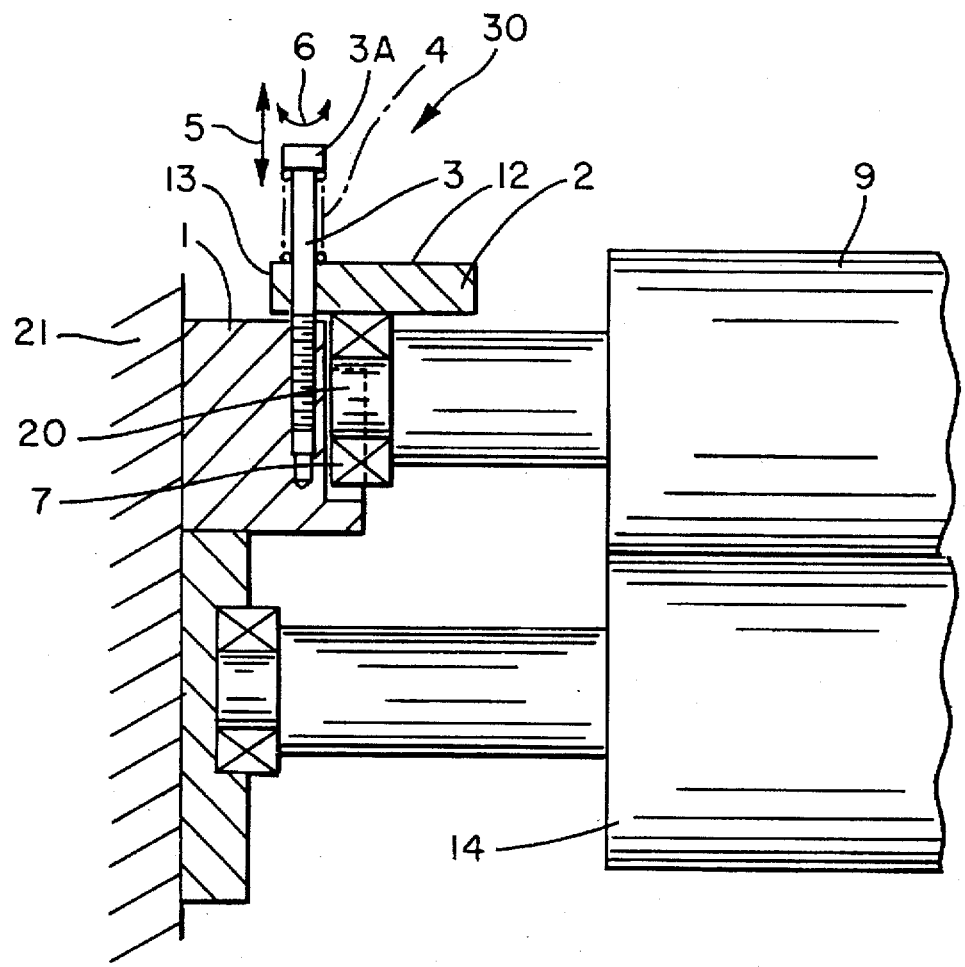
FIG. 1 is a schematic view of a roller supporting socket constructed in accordance with the teachings of the present invention.

A roller supporting socket 30 constructed in accordance with the teachings of the instant invention is illustrated in FIG. 1 in connection with a roller train of an inking unit of an offset printing machine. Those skilled in the art will, appreciate that the roller train of the inking unit is included in the figures and following description for illustrative purposes only, and that the disclosed roller supporting socket could be used with different types of rotationally symmetric components and/or in connection with other applications without departing from the scope or the spirit of the invention. Further, although for simplicity only one side of the rollers of the inking unit have been illustrated, those skilled in the art will appreciate that the rollers are symmetrical and that the other side of the rollers and their respective mountings and sockets would be a substantial mirror image of those shown in the illustrations.

In the illustrated embodiment, the roller train of the inking unit includes two rollers 9, 14 disposed in operative engagement. Each end of the roller 9 has a journal 8 with a bearing 7 arranged thereon that is received in socket 30. As explained in detail below, the socket 30 is adapted such that the roller 9 can be quickly released from the socket 30. As also explained below, the socket 30 is further adapted to permit a user to optionally vary the position of the roller 9 relative to the roller 14 to change the pressure that roller 9 exerts on roller 14.

In order to generally locate the roller 9 in a desired position, the socket 30 is provided with a mounting 1 attached to the frame 21 of the printing machine. Preferably, this mounting 1 is pivotably attached to the machine frame 21. However, those skilled in the art will readily appreciate that the mounting 1 could be rigidly attached to the frame 21 without departing from the scope of the invention. In any event, the mounting 1 preferably forms a three-sided seat for receiving the bearing 7 of a roller 9 (FIG. 1).

To ensure the bearing 7 remains within the three-sided seat of the mounting 1 during use, and to enable the socket 30 to apply a suitable biasing force to the roller 9, the socket 30 is provided with a locking lever 2. The locking lever 2 is secured to the mounting 1 via an adjusting screw 3 which mates with a threaded bore in the mounting 1 (FIG. 1). More specifically, the locking lever 2 defines a bore 11 which is concentrically aligned with the threaded bore of the mounting 1 and which receives the adjusting screw 3 such that the locking lever 2 is located between the mounting 1 and the free end 3A of the adjusting screw 3.

For the purpose of applying an adjustable biasing force to the roller 9, the socket 30 is provided with a first spring element 4 disposed concentrically around the adjusting screw 3 between the free end 3A of the screw 3 and a surface of the locking lever 2 (FIG. 1). The spring element 4 acts as a compression spring that forces the locking lever 2 against the roller 9. By adjusting the linear position of the adjustable screw 3, i.e., by screwing the screw 3 into or out of the threaded bore defined in mounting 1, a user can adjust the amount of force exerted by the locking lever 2 against the roller 9.

Those skilled in the art will appreciate that this arrangement permits the locking lever 2 freedom of movement in two directions. More particularly, the locking lever 2 can both rotate about and slide linearly relative to the longitudinal axis of the adjusting screw 3 in the directions respectively referenced 6 and 5 in FIG. 1. Thus, the adjusting screw 3 and the locking lever 2 form a turning and sliding joint.

Figures 2, 2A:
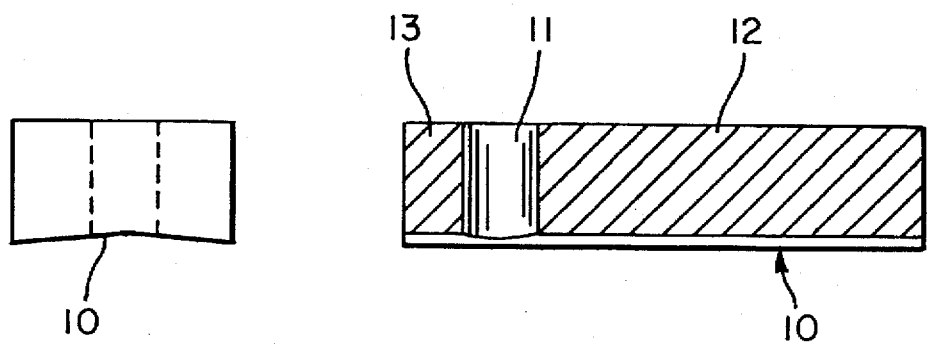
FIG. 2 is a side view of the locking lever of the roller supporting socket of FIG. 1.
FIG. 2A is an end view of the locking lever of FIG. 2.

For the purpose of quickly changing the roller 9, the locking lever 2 is adapted for movement between a locked and an unlocked position. As shown in FIG. 2, the bore 11 essentially divides the locking lever into two lever arms 12, 13. When the locking lever 2 is pivoted into the locked position (FIG. 1), the smaller lever arm 13 faces the machine frame 21 and the larger lever arm 12 faces the 10 roller 9 such that the locking lever 2 is in parallel alignment with the rotational axis of the roller 9. In the unlocked position, the locking lever 2 is pivoted in the direction 6 about the longitudinal axis of the adjustable screw 3 such that the roller 9 can be removed through the open side of the three-sided seat defined by the mounting 1. Preferably, the locking lever 2 need only be pivoted approximately 90° from the locked position to permit removal of the roller 9. However, those skilled in the art will appreciate that the locking lever can be constructed to require other degrees of rotation such as 180° before the roller 9 can be removed through the open side of the three-sided seat without departing from the scope or the spirit of the invention.

To locate the roller within the three-sided seat of the mounting 1 and to ensure that the roller is firmly secured therein when the locking lever 2 is positioned in the locked position, the locking lever 2 is provided with centering means. In the preferred embodiment this centering means comprises a locking bevel 10 formed on the side of the locking lever 2 that faces the roller 9 (FIG. 2A). This locking bevel 10 preferably includes two angled sides disposed at equal but opposite angles which locate the roller 9 relative to the lever 2 and prevent the lever 2 from inadvertently pivoting relative to the roller 9 during use. In the locked position, the locking bevel 10 frictionally engages the bearing 7 thereby locking the bearing 7 and the roller 9 in the socket 30.

Although, as explained above, the centering means is preferably implemented as a locking bevel 10, those skilled in the art will appreciate that the centering means could be implemented in other ways without departing from the scope or the spirit of the invention. For example, the centering means may be implemented as a ball rest or be provided with a curvature to receive the bearing 7 of the roller 9.

In order to install a roller into the socket 30 of the present invention, each socket 30 can be opened so that there is sufficient free space for inserting the roller 9 therein. In the illustrated embodiment, the socket 30 can be opened by manually pivoting the locking lever 2 about the adjusting screw 3 approximately 90° into the unlocked position. The roller 9 may then be placed into the three-sided seat of the mounting 1 such that it rests against the first adjacent roller 14. Guide surfaces 20 arranged on the mounting 1 may optionally be provided for assisting the insertion of the roller 9 into the mounting 1.

To lock the roller 9 into the socket, the locking lever 2 is pivoted about the longitudinal axis of the screw 3 until the locking bevel 10 engages the outer ring of the bearing 7. More particularly, the locking lever 2 is lifted over the bearing 7 counter to the bias of the spring 4 until the locking bevel 10 engages the outer ring of the bearing 7, thereby locking the locking lever 2 in frictional engagement with the bearing 7 and, in turn, locking the roller 9 into the socket 30 such that the roller 9 is properly positioned relative to the adjacent roller 14.

The pressure that the locking lever 2 exerts on the roller 9 and, in turn, the pressure that the roller 9 exerts on the adjacent roller 14 can be set to a desired level by varying the position of the adjusting screw 3. More particularly, by threading the adjusting screw 3 further into or out of the bore of the mounting 1, a user can adjust the bias exerted by the spring element 4 on the locking lever 2 which, in turn effects the amount of pressure that the roller 9 exerts on the adjacent roller 14. This pressure can be set or adjusted at any time. Moreover, when the roller 9 is changed, the socket 30 will automatically apply the same pressure to the new roller that was applied to the previous roller unless the user intentionally changes the setting of the adjustment screw 3.

Figure 3:
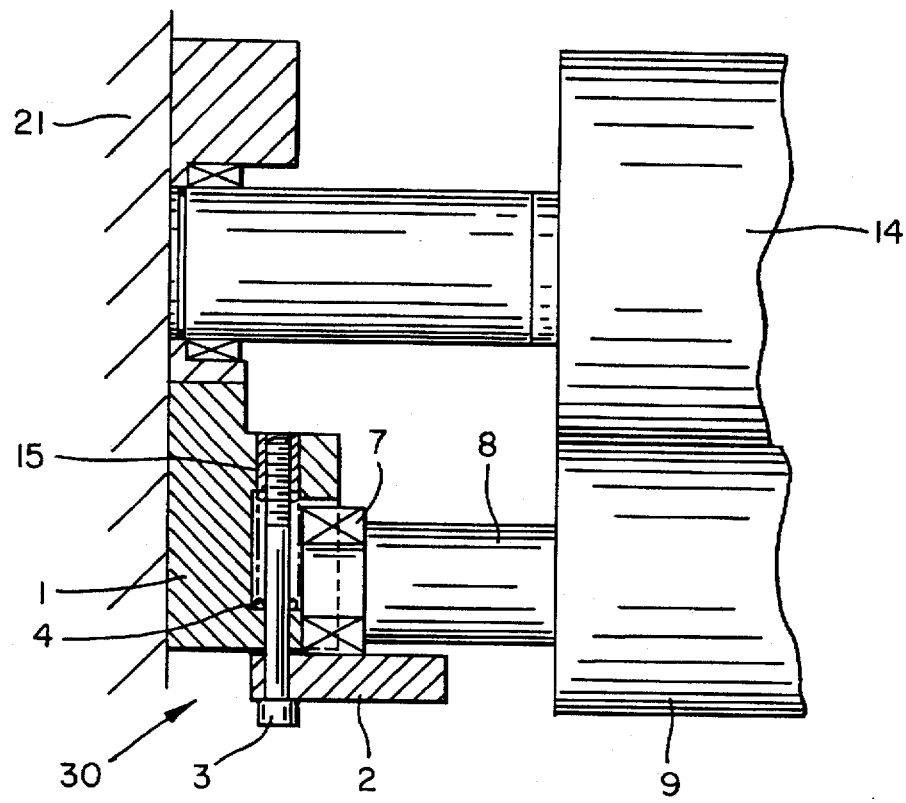
FIG. 3 is a schematic view of an alternative roller supporting socket constructed in accordance with the teachings of the present invention.

In order to provide additional space to facilitate the removal and installation of rollers when the rollers are arranged in a tight manner, the first spring element 4 of the socket 30A can be positioned inside the mounting 1 concentrically with the adjusting screw 3 (FIG. 3). In this embodiment, the spring element 4 is supported within the bore of the mounting 1 on a threaded sleeve 15. The threaded sleeve 15, which is also arranged in the bore of the mounting 1, includes internal threading which mates with the adjusting screw 3. Although the threaded sleeve 15 is longitudinally displaceable relative to the bore of the mounting 1 (which in this embodiment is preferably not threaded), the threaded sleeve 15 is secured in the mounting 1 such that it cannot rotate relative to the adjusting screw 3. Thus, when the adjusting screw 3 is turned in order to change the pressure setting of the roller 9, the mating threads of the adjusting screw 3 and the threaded sleeve 15 cause the threaded sleeve 15 to move linearly relative to both the adjusting screw 3 and the bore of the mounting 1 thereby either further biasing or relieving the bias of the spring element 4 depending upon the direction the screw 3 is rotated. As with the embodiment of the socket 30 illustrated in FIG. 1, adjusting the bias of the spring element 4 changes the force applied by the locking lever 2 of the socket 30A to the roller 9.

Figure 4:
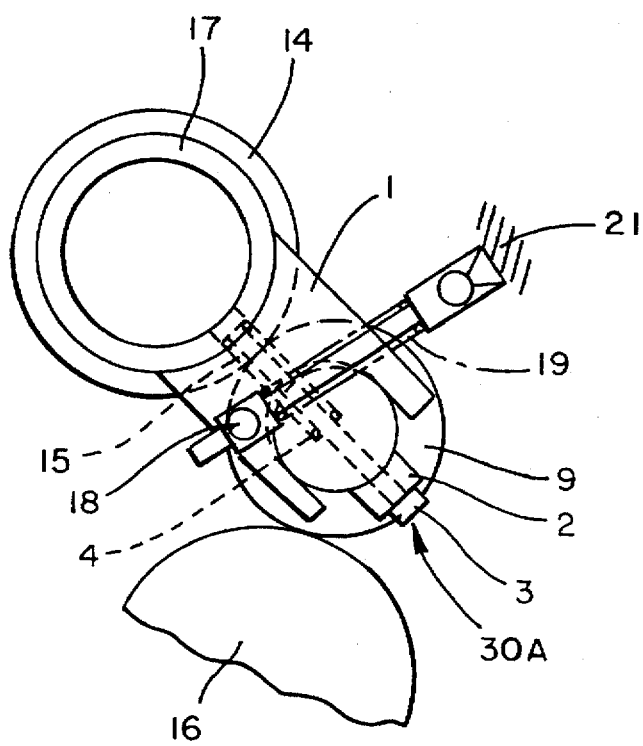
FIG. 4 is a schematic view of the roller supporting socket of FIG. 2 employed in connection with a second spring element to bias a supported roller against two adjacent rollers.

Those skilled in the art will appreciate that a user can employ a socket constructed in accordance with the teachings of the instant invention to bias a supported roller 9 into contact with two adjacent rollers 14, 16 (FIG. 4). In such an instance, the mounting 1 of the socket 30A is arranged on the machine frame 21 in a first rotary joint 17 which, in the illustrated embodiment, is axially parallel to the roller 14. As explained above, the socket 30A includes a locking lever 2, an adjusting screw 3, a threaded sleeve 15 and a first spring element 4 which, in conjunction with the mounting 1, bias roller 9 against adjacent roller 14. The spring force of the locking lever 2 is directed towards the roller gap formed by the rollers 9 and 14.

In order to further bias the roller 9 against a second adjacent roller 16, a second spring element 19 is arranged on the mounting 1 in a second rotary joint 18 supported relative to the machine frame 21. This second spring element 19 provides a force which biases the roller 9 against the second adjacent roller 16. Those skilled in the art will appreciate that the rotary joints 17, 18 permit the roller 9 to move in response to the biasing forces of the first and second spring elements 4, 19.

Those skilled in the art will further appreciate that, while in the illustrated embodiments, the socket 30, 30A receives a bearing disposed on the end of a journal of a roller in a printing machine, the socket 30, 30A could likewise be employed to support other rotationally symmetrical components such as a plug-in axle or a roller lock. Further, while the second embodiment of the socket 30A has been illustrated in FIG. 4 in connection with biasing the supported roller 9 against two adjacent rollers 14, 16, those skilled in the art will readily appreciate that the first embodiment of the socket 30 shown in FIG. 1 would likewise be appropriate in this role.

Finally, although the invention has been described in connection with certain embodiments, it will be understood that there is no intent to in any way limit the invention to those embodiments. On the contrary, the intent is to cover all alternatives, modifications and equivalents included within the spirit and scope of the invention as defined by the appended claims.

We claim:

1. A socket for releasably supporting a first roller in a printing machine having a frame, the socket comprising:

a mounting attached to the frame of the printing machine, the mounting including a seat for receiving the first roller, the mounting defining a bore;

an adjusting screw having a first end received in the bore of the mounting and a second end opposite the first end, the adjusting screw having a longitudinal axis;

a locking lever disposed between the mounting and the second end of the adjusting screw, the locking lever being linearly movable along the longitudinal axis of the adjusting screw and further being rotatable about the longitudinal axis of the adjusting screw between a locked position and an unlocked position, the locking lever engaging the first roller in the locked position to secure the first roller within the socket, said locking lever having an inwardly deformed centering surface engageable with the first roller when in the locked position; and a spring disposed between the locking lever and the second end of the adjusting screw for biasing the locking lever towards the mounting.

2. A socket as defined in claim 1 wherein the mounting is pivotably secured to the frame of the printing machine.

3. A socket as defined in claim 1 wherein the locking bevel includes two angled sides disposed at equal but opposite angles to frictionally engage the first roller.

4. A socket as defined in claim 1 wherein the locking lever defines a bore for receiving the adjusting screw, the bore being disposed in alignment with the threaded bore of the mounting.

5. A socket as defined in claim 4 wherein the locking lever has a first lever arm disposed on a first side of the bore of the locking lever and a second lever arm disposed on a second side of the bore of the locking lever, the first lever arm being shorter than the second lever arm, the first lever arm being disposed adjacent the first roller when the locking lever is in the locked position to lock the first roller within the seat of the mounting.

6. A socket as defined in claim 1 wherein the locking lever biases the first roller into engagement with an adjacent second roller.

7. A socket as defined in claim 6 further comprising a first rotary joint for pivotably coupling the mounting to the frame of the printing machine, a third roller disposed adjacent to the first roller, and a second spring element pivotably coupled to the frame of the printing machine by a second rotary joint for biasing the first roller against the third roller.

8. A socket as defined in claim 1 wherein the spring is arranged concentrically on the adjusting screw between the locking lever and the second end of the adjusting screw.

9. A socket as defined in claim 1 in which said mounting bore is threaded, and said first end of said adjusting screw is in threaded engagement with said mounting bore.

10. A socket as defined in claim 9 wherein the biasing force exerted by the spring against the locking lever can be adjusted by turning the adjusting screw relative to the threaded bore of the mounting.

11. A socket for releasably supporting a first roller in a printing machine having a frame, the socket comprising:

a mounting attached to the frame of the printing machine, the mounting including a seat for receiving the first roller, the mounting defining a bore having a first end and a second end;

a threaded sleeve disposed within the bore of the mounting adjacent the first end of the bore, the threaded sleeve being linearly movable within the bore and being secured against rotation relative to the bore of the mounting;

an adjusting screw having a first end threadably received in the threaded sleeve and a second end opposite the first end, the adjusting screw having a longitudinal axis;

a locking lever disposed between the mounting and the second end of the adjusting screw, the locking lever being linearly movable along the longitudinal axis of the adjusting screw and further being rotatable about the longitudinal axis of the adjusting screw between a locked position and an unlocked position, the locking lever engaging the first roller in the locked position to secure the first roller within the socket, said locking lever having an inwardly deformed centering surface engageable with the first roller when in the locked position; and a spring disposed within the bore of the mounting between the threaded sleeve and the second end of the bore of the mounting for biasing the locking lever towards the mounting.

12. A socket as defined in claim 11 wherein the mounting is pivotably secured to the frame of the printing machine.

13. A socket as defined in claim 12 further comprising a first rotary joint for pivotably coupling the mounting to the frame of the printing machine, a third roller disposed adjacent to the first roller, and a second spring element pivotably coupled to the frame of the printing machine by a second rotary joint for biasing the first roller against the third roller.

14. A socket as defined in claim 11 wherein the locking bevel includes two angled sides disposed at equal but opposite angles to frictionally engage the first roller.

15. A socket as defined in claim 11 wherein the locking lever defines a bore for receiving the adjusting screw, the bore of the locking lever being disposed in alignment with an opening defined in the second end of the bore of the mounting.

16. A socket as defined in claim 15 wherein the locking lever has a first lever arm disposed on a first side of the bore of the locking lever and a second lever arm disposed on a second side of the bore of the locking lever, the first lever arm being shorter than the second lever arm, the first lever arm being disposed adjacent the first roller when the locking lever is in the locked position to lock the first roller within the seat of the mounting.

17. A socket as defined in claim 11 wherein the locking lever biases the first roller into engagement with an adjacent second roller.

18. A socket as defined in claim 11 wherein the spring is arranged concentrically on the adjusting screw between the locking lever and the second end of the adjusting screw.

19. A socket as defined in claim 11 wherein the biasing force exerted by the spring against the locking lever can be adjusted by turning the adjusting screw relative to the threaded sleeve.

20. A socket for releasably supporting a rotationally symmetrical component in a frame, the socket comprising:

a mounting attached to the frame, the mounting including a seat for receiving the rotationally symmetrical component;

an adjusting screw rotationally coupled to the mounting and having a first threaded end and a second end opposite the first end, the adjusting screw having a longitudinal axis;

a locking lever disposed between the mounting and the second end of the adjusting screw, the locking lever being linearly movable along the longitudinal axis of the adjusting screw and further being rotatable about the longitudinal axis of the adjusting screw between a locked position and an unlocked position, the locking lever engaging the rotationally symmetrical component in the locked position to secure the rotationally symmetrical component within the socket, said locking lever having an inwardly deformed centering surface engageable with the first roller when in the locked position; and a spring for biasing the locking lever towards the mounting.

21. A socket as defined in claim 20 wherein the adjusting screw is rotationally coupled to the mounting via a threaded bore defined in the mounting, and wherein the spring is disposed between the locking lever and the second end of the adjusting screw.

22. A socket as defined in claim 20 wherein the adjusting screw is rotationally coupled to the mounting via a threaded sleeve disposed within a bore defined in the mounting, the bore of the mounting having an end, the threaded sleeve being linearly movable within the bore and being secured against rotation relative to the bore of the mounting, the spring being disposed within the bore of the mounting between the threaded sleeve and the end of the bore.

23. A socket for releasably supporting a first roller in a printing machine having a frame, the socket comprising:

a mounting attached to the frame of the printing machine, the mounting including a seat for receiving the first roller, the mounting defining a threaded bore;

an adjusting screw having a first end threadably received in the threaded bore of the mounting and a second end opposite the first end, the adjusting screw having a longitudinal axis;

a locking lever disposed between the mounting and the second end of the adjusting screw, the locking lever being linearly movable along the longitudinal axis of the adjusting screw and further being rotatable about the longitudinal axis of the adjusting screw between a locked position and an unlocked position, said locking lever engaging the first roller in the locked position to secure the first roller within the socket, said locking lever being formed with a centering bevel on a side of the locking lever adjacent the first roller for locating the first roller within the seat of the mounting; and a spring disposed between the locking lever and the second end of the adjusting screw for biasing the locking lever towards the mounting.

24. A socket for releasably supporting a first roller in a printing machine having a frame, the socket comprising:

a mounting attached to the frame of the printing machine, the mounting including a seat for receiving the first roller, the mounting defining a bore having a first end and a second end;

a threaded sleeve disposed within the bore of the mounting adjacent the first end of the bore, the threaded sleeve being linearly movable within the bore and being secured against rotation relative to the bore of the mounting;

an adjusting screw having a first end threadably received in the threaded sleeve and a second end opposite the first end, the adjusting screw having a longitudinal axis;

a locking lever disposed between the mounting and the second end of the adjusting screw, the locking lever being linearly movable along the longitudinal axis of the adjusting screw and further being rotatable about the longitudinal axis of the adjusting screw between a locked position and an unlocked position, said locking lever engaging the first roller in the locked position to secure the first roller within the socket, said locking lever being formed with a centering bevel on a side of the locking lever adjacent the first roller for locating the first roller within the seat of the mounting; and a spring disposed within the bore of the mounting between the threaded sleeve and the second end of the bore of the mounting for biasing the locking lever towards the mounting.

* * * * *